United States Patent
Lacombe

(10) Patent No.: US 8,784,026 B2
(45) Date of Patent: Jul. 22, 2014

(54) DEVICE FOR MOUNTING A SPOKE ON A WHEEL RIM OR HUB

(76) Inventor: Jean Pierre Lacombe, Marcellaz Albanais (FR)

( * ) Notice: Subject to any disclaimer, the term of this patent is extended or adjusted under 35 U.S.C. 154(b) by 1719 days.

(21) Appl. No.: 11/884,853

(22) PCT Filed: May 20, 2005

(86) PCT No.: PCT/FR2005/001272
§ 371 (c)(1),
(2), (4) Date: Sep. 9, 2008

(87) PCT Pub. No.: WO2006/090020
PCT Pub. Date: Aug. 31, 2006

(65) Prior Publication Data
US 2009/0050276 A1    Feb. 26, 2009

(30) Foreign Application Priority Data
Feb. 23, 2005  (FR) ...................................... 05 01836

(51) Int. Cl.
*F16B 39/00*  (2006.01)

(52) U.S. Cl.
USPC .......................... 411/259; 411/427; 29/525.02

(58) Field of Classification Search
USPC .......... 301/74–76; 411/5, 259, 427, 101, 116, 411/312, 222; 29/525.03, 525.02
See application file for complete search history.

(56) References Cited

U.S. PATENT DOCUMENTS

| 168,021 | A | * | 9/1875 | Holton | 411/275 |
|---|---|---|---|---|---|
| 1,474,183 | A | * | 11/1923 | Wagenhorst | 301/56 |
| 1,812,785 | A | * | 6/1931 | Helin | 411/308 |
| 2,361,107 | A | * | 10/1944 | Johnson | 411/301 |
| 2,390,662 | A | * | 12/1945 | Perry | 411/291 |
| 3,087,525 | A | * | 4/1963 | Nyswaner et al. | 411/230 |
| 3,391,720 | A | * | 7/1968 | Morse | 411/259 |
| 4,585,046 | A | * | 4/1986 | Buckley | 157/1.55 |
| 4,778,318 | A | * | 10/1988 | Jeal | 411/43 |
| 6,205,664 | B1 | | 3/2001 | Cappellotto | |
| 6,210,091 | B1 | * | 4/2001 | Ono et al. | 411/303 |
| 6,557,946 | B1 | | 5/2003 | Gerrit et al. | |

FOREIGN PATENT DOCUMENTS

| EP | 0 123 519 | 10/1984 |
|---|---|---|
| EP | 0 838 352 | 4/1998 |
| FR | 2 801 247 | 5/2001 |
| WO | WO 2004/065138 | 8/2004 |

* cited by examiner

*Primary Examiner* — Jacob Cigna
(74) *Attorney, Agent, or Firm* — Fay Sharpe LLP

(57) ABSTRACT

A device for mounting a spoke (1) on a wheel rim or hub, includes a spoke (1) having a rod extending along an axis (X-X') with one end (11) provided with an external thread (110). The threaded end is screwed inside the internal thread of a nut (2) mounted in an opening provided inside the rim or hub. At least part of the threaded end (11) of the spoke (1) screwed in the nut (2), is curved relative to the axis (X-X'), so as to increase the braking torque by direct friction of the nut (2) relative to the rod.

10 Claims, 3 Drawing Sheets

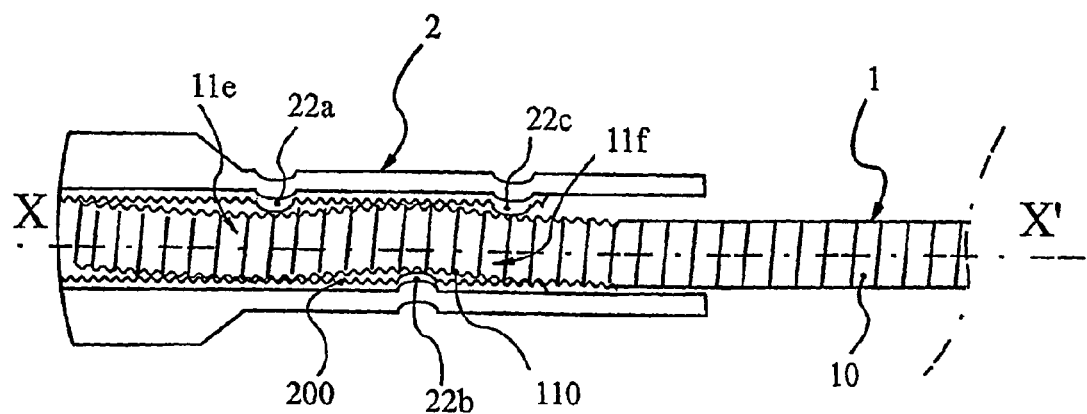
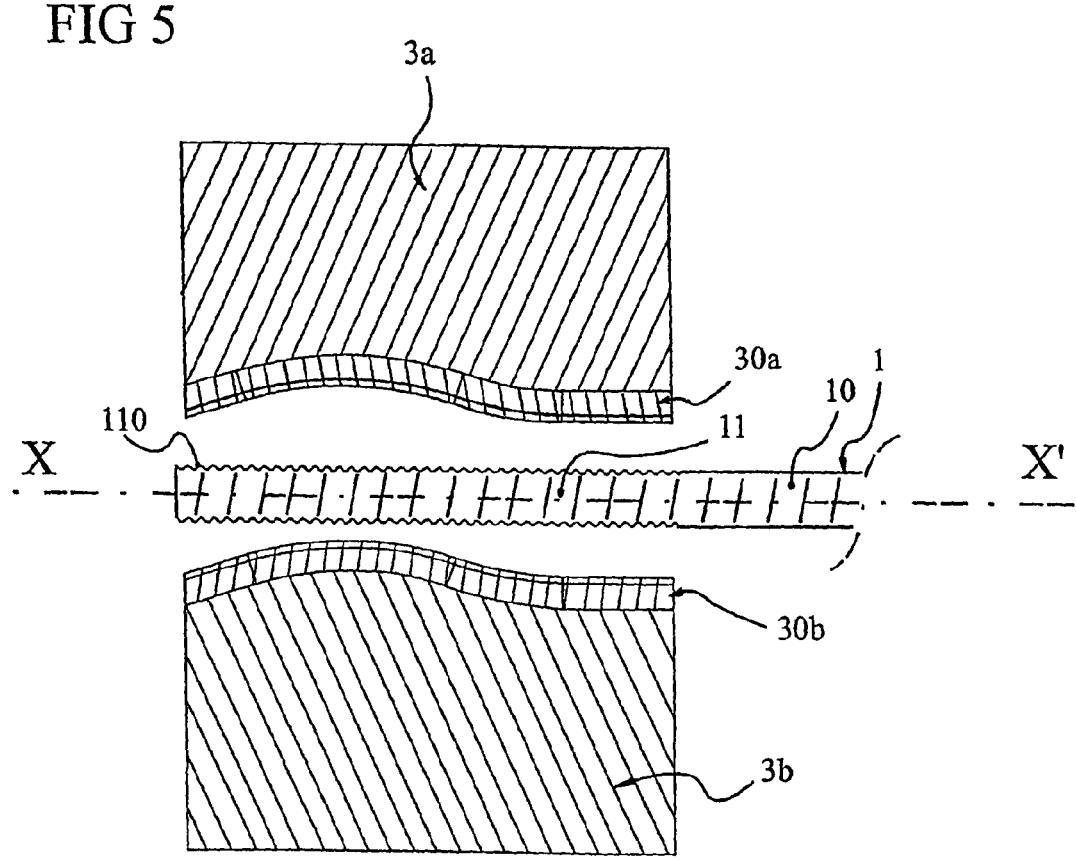

DEVICE FOR MOUNTING A SPOKE ON A WHEEL RIM OR HUB

BACKGROUND

The present invention relates to a device for mounting a spoke on a wheel rim or hub.

It applies more particularly to the wheels of a bicycle.

The mounting of a spoke on a wheel rim is generally carried out using a nut traversing the wheel rim and screwed around the spoke. This mounting creates a tension in the spoke, and one obtains an assembled wheel of quality when the tension is uniform in all the spokes assembled on the rim. The spoke/nut connection can also be carried out on the level of the hub of wheel.

However, it is known that in such an assembly, the wheel thus assembled receives sudden lateral shocks and forces, which causes the relaxation of the effected spokes and the loosening of the nuts and has as a consequence the appearance of effects known as "sail" and "jump" on the effected wheel. These loosening effects appear more particularly on the rear wheels of a bicycle which have less tightened spokes on the side opposed to the free wheel. These loosening effects thus appear more frequently on the side opposite to that where the pinions are mounted.

To solve these problems of relaxation of the spokes and loosening of the nuts relative to the spokes, various solutions have already been proposed.

There is first of all, the solutions of the handcrafted type specific to each assembler of wheels who uses, according to their experience and the means available, the glue, various resins, tallow . . . .

Some have tried to develop industrial solutions directly at the time of the manufacture of the wheel.

Thus, it is known to stick the nut on the spoke with anaerobic adhesive such as that sold under mark "LOCTITE". This solution is of a high cost and not very reliable because the polymerization of the adhesive is random and a possible later tension adjustment shears the adhesive and the risk of loosening reappears.

U.S. Pat. No. 6,205,664 shows a nut whose head holds a plastic ring which brakes the threaded end of the spoke screwed in to the nut. This solution is reliable but of a high cost because delicate to effectuate.

U.S. Pat. No. 6,557,946 shows a nut for a spoke in which an encapsulated adhesive is placed in the part opposite to the head and which also brakes the threaded end of the spoke screwed in to the nut. This solution is also of a very high cost, which leaves it applicable to the top-of-the-line wheels. Moreover as the solution of joining seen above, it does not allow multiples readjustment without shearing of the adhesive.

Lastly, patent FR2801247 shows a nut deformed locally by a punch, which locally crushes at the same time the thread of the nut and that of the rod of spoke. This solution is not reliable because the local deformation is too weak to obtain a satisfactory braking in the tolerance range of thread screw/nut thread.

SUMMARY

The goal of the invention is then to propose another particularly simple, reliable and not very expensive solution.

To this end, the invention has as an object a device for mounting a spoke on a rim of wheel, of the type including a spoke including a rod which extends along an axis (X-X') and whose end is provided with an external threading screwed into the internal threads of a nut, mounted in an opening defined interior to the rim, characterized in that at least a part of the threaded end of the spoke, screwed in to the nut, is curved relative to axis (X-X'), in order to increase the braking torque by direct friction of the nut by connection to the rod.

The general problems of the braking of a spoke nut relative to the spoke are in particular related to the fact that threads are of very small dimension and that the standardized tolerance between the screw and the nut is relatively wide compared to the nominal dimension of threads. Thus for a thread diameter of 2.25 mm and a thread on the order of 0.45 mm, the extent of the play is approximately 0.15 mm, and consequently, to obtain a relatively constant braking torque in all these tolerance cases, it is necessary to have a deformable element which compensates for the variations of play of this screw/nut adjustment.

The idea of the patent is to use the spoke itself as deformable element by making it work in a bent state inside the nut itself. Thus, one does not add an additional element. The bending of the spoke generates stress of radial contact between the screw and the nut and induces a tangent component by friction thus generating a braking torque that one seeks to their rotational displacement.

BRIEF DESCRIPTION OF THE DRAWINGS

Other characteristics and advantages of the invention will emerge from the description which will follow relative to the annexed drawings which are given only by way of nonlimiting examples.

FIG. 4 is a longitudinal cross-sectional view of another embodiment of the mounting device according to the invention;

FIG. 5 is a diagrammatic view in longitudinal section of tooling for fabricating the spoke according to the invention.

DETAILED DESCRIPTION

Figure 1:
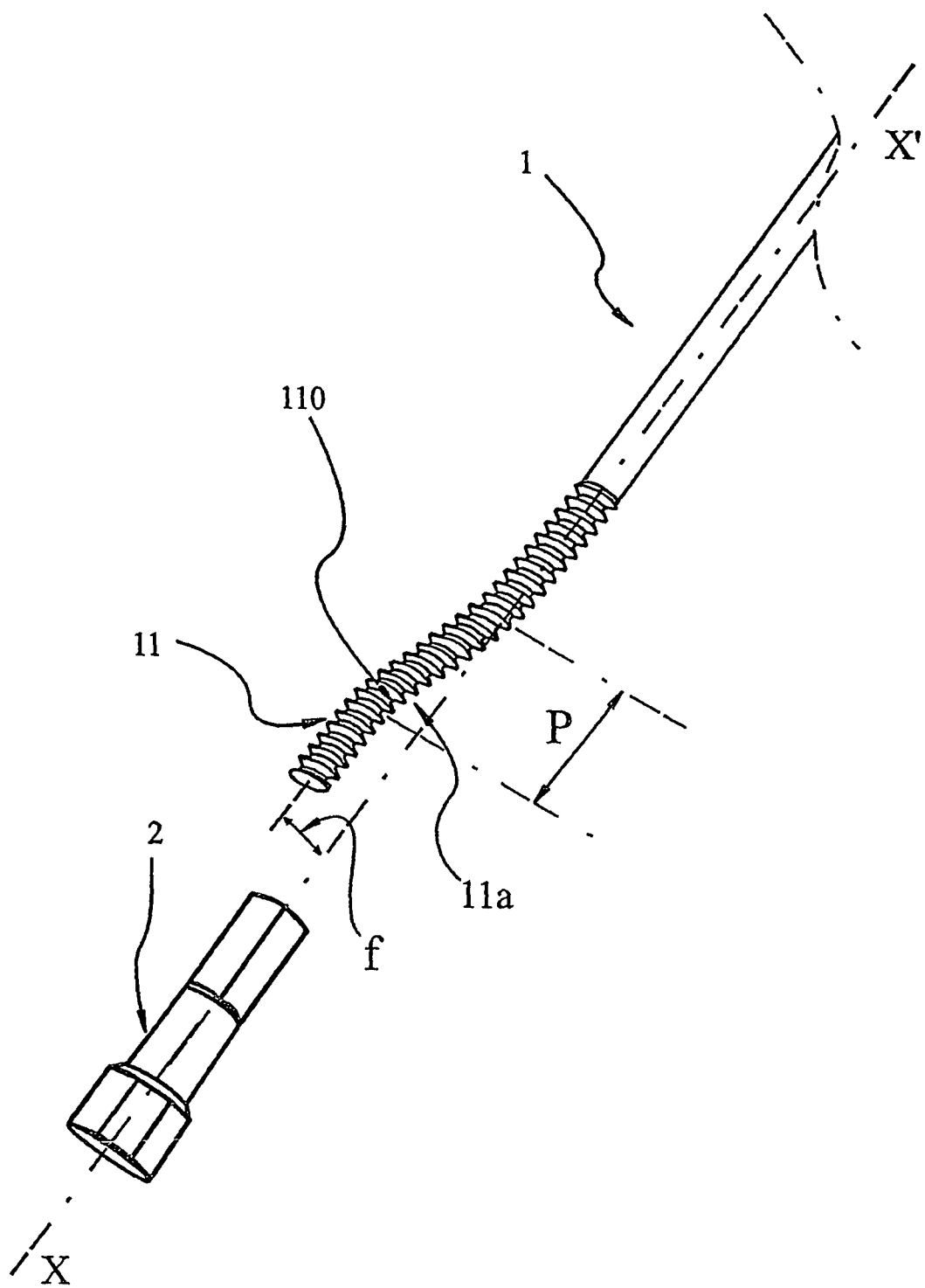
FIG. 1 is an expanded perspective view of a spoke and its associated nut, according to the preferred embodiment of the invention and before mounting.

The mounting of the spoke (1) in the nut (2) according to the invention is illustrated in the various figures with play between the nut and the spoke intentionally exaggerated to facilitate the understanding of the invention.

According to the illustrated embodiment, the device according to the invention for mounting a spoke (1) on a wheel rim is of the type including a spoke (1) made up of a rod (10) which extends according to an axis (X-X') and whose end (11) is provided with an external thread (110) screwed into the internal threads (200) of a nut (2), mounted in an opening defined inside the rim.

According to the invention, at least a part (11a, 11b, 11c, 11d, 11e, 11f) of the threaded end (11) of the spoke (1), screwed in the nut (2), is curved relative to axis (X-X') in order to increase the braking torque by direct friction of the nut (2) relative to the rod (10).

Figure 2:
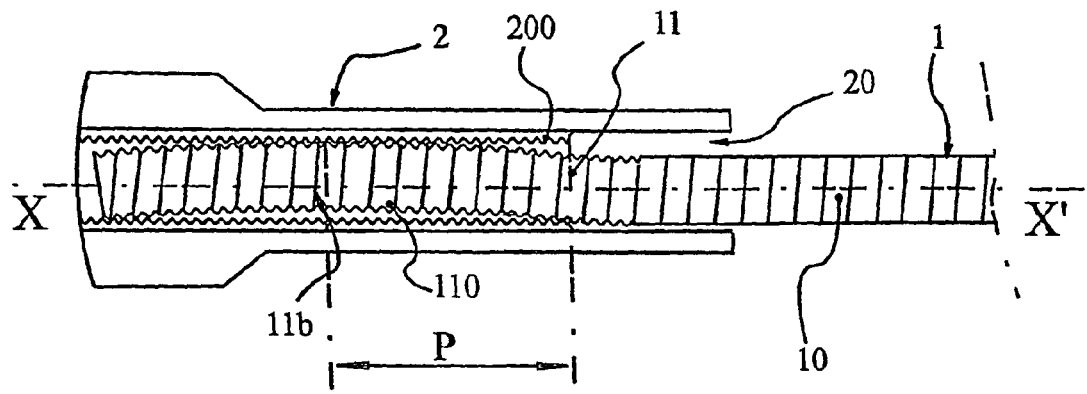
FIG. 2 is a longitudinal cross-sectional view of a device for mounting together the nut and the spoke according to FIG. 1.

According to the preferred embodiment of FIGS. 1 and 2, the curved part has a single curve (11a) relative to the axis (X-X'). According to this embodiment, the nut (2) is known in itself while the spoke (1) was fabricated according to a manufacturing process, in which one carries out a step of threading (110) an end (11) of the rod (10) component of the spoke (1) and in which one bends at least a part (11b) of the threaded end (110). According to the alternative embodiment of the FIG. 2a, the nut (2) is also known in itself and the spoke (1) was fabricated according to the same manufacturing process but bending two parts (11b, 11c), and thus, the bent part has at least two opposite curves (11b, 11c) relative to axis (X-X'), such as a concave curve (11b) and a convex curve (11c).

According to the alternative embodiments of FIGS. 1 with 2a, the curvature of the threaded end (11) of the spoke (1) is such as the rod (10) is coaxial with the housing (21) of the nut (2), assembled in a wheel rim (not represented), into which it is screwed.

Figure 2A:
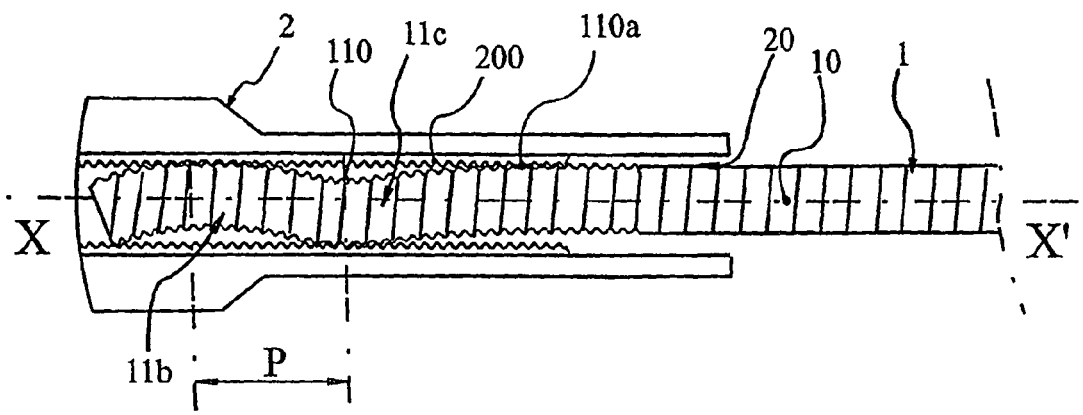
FIG. 2a is also a longitudinal cross-sectional view of a mounting device according to the embodiment of FIGS. 1 and 2 but with an alternative of the spoke.
Figure 3:
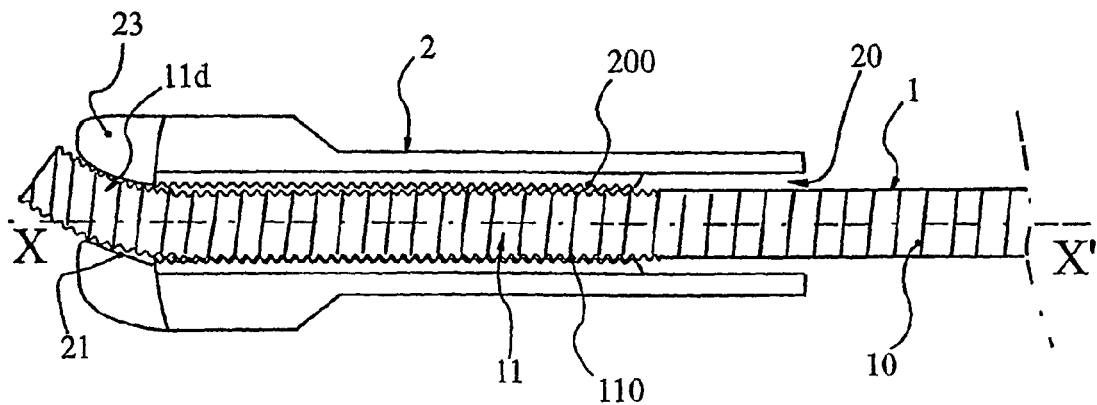
FIG. 3 is a longitudinal cross-sectional view of another embodiment of the mounting device according to the invention.

As mentioned previously, the play between the spoke (1) and the nut (2), as shown in FIGS. 2 to 4, was intentionally exaggerated. Thus, in the FIG. 2a, only the high part of the first thread (110a) of the spoke (1) is shown engaged with the nut (2). Actually, these first threads (110a) are engaged over all the periphery, preferably over a length of approximately 0.4 mm after mounting.

According to embodiments illustrated to the FIGS. 1, 2, 2a and 4, the curved part (11a, 11b, 11c, 11e, 11f) of the threaded end (11) of the spoke (1) is curved inside the nut.

According to the illustrated embodiment of FIG. 3, the curved part (11d) of the threaded end (11) of the spoke (1) is curved outside the nut (2) on the side of the rim (not represented).

According to the embodiment illustrate with FIGS. 3 and 4, the nut (2), of the type which includes a housing (20) the periphery of which is manufactured with an internal thread (tapping) (200), including, according to the invention, a means (21, 22a, 22b, 22c) disposed inside housing (20), and intended to bend at least a part (11d, 11e, 11f) of a threaded end (11) of a rod (10) screwed into the housing (20).

According to the embodiment illustrated in FIG. 3, the means include at least a slope (21), defined in the head (23) of nut (2) and intended to modify the profile of the housing locally in order to curve the part of the threaded end of the screwed in rod, outside housing.

According to the embodiment illustrated in FIG. 4, the means include at least an embossing (22a, 22b, 22c), disposed on an intermediate part of internal threads (200) while being directed towards the interior of housing and being intended to bend the part of the threaded end of the screwed in rod, inside housing. Preferably, the means include at least two embossings (22a, 22b) diametrically opposite and longitudinally spaced one (22a) from the other (22b) in housing (20). Thus, in this embodiment, the spoke con be completely standard and rectilinear before its introduction into the nut and in fact the embossings on the nut deform it in flexure at the time of its screwing in, thus generating the desired braking torque.

According to the preferred manufacturing process of the spoke (1) according to the invention, the spoke (1) is curved by introduction into the space defined by the two stamping elements (3a, 3b) of form separated one of the other (FIG. 5). These two stamping elements (3a, 3b) each present one an internal surface (30a) complementary to the other (30b) and presenting a curved profile (11a) to give to the spoke. Once introduced between the two stamping elements (3a, 3b) and according to the preferred process of the invention, the two stamping elements (3a, 3b) are brought closer to one another and thus closed on the spoke (1) which takes the desired curved form and regains a stable shape by elastic return at the time of the separating of the stamping elements (3a, 3b) one from the other. Advantageously, the elements (3a, 3b) according to the invention will form an integral part of a machine established at the end of production lines for existing spokes, such that the line of fabricating machines with multiple stations intended to transform a roll of wire into a spoke for rim of bicycle are uninterrupted.

The invention which has been just described allows a simple, reliable and inexpensive mounting of a nut on a wheel spoke of a bicycle. Thus, the braking torque according to the invention is controlled precisely and stablely to any tolerances of fit between the spoke and the nut.

One obtained very good braking results in an embodiment of a spoke with threads of 2.25 mm diameter according to FIGS. 1 and 2 presenting a deflection or offset (f) ranging between 0.1 and 0.5 mm, preferably of 0.3 mm before assembly over a length (P) between supports ranging between 7 and 8 mm, preferably 9 mm before assembly, the spoke, once screwed in, regaining the shape of the nut by nevertheless adjusting for play in the threads.

It can be advantageous to exaggerate the deflection or off-set of the spoke, because, in this case, at the time of the first screwing in, the spoke will be engaged by the nut which will plastically limit its off-set: thus if one unscrews a spoke which had been screwed in completely beforehand, one notes that its off-set will have decreased. In other words, it will have been unbent to adapt to the maximum of its deformation capability in inflection relative to the nut and their relative play, thus gauging the braking torque more precisely by plastic deformation. The use of multiple waves, as shown the FIG. 2a, makes it possible to increase the maximum braking torque, the inflection of the spoke being however more rigid and the torque being thus increased but less stable compared to spreading out the tolerances between the threads of the spoke and the tapping of the nut.

In a general way, it is preferable that the first threads engage between the nut and the spoke exactly rectilinear or not deformed, because those are these first threads which most sought: it is thus preferable to begin the curving of the spoke right after this zone so as not to risk weakening the strength of the first threads of the spoke (see FIG. 2a).

The invention can apply perfectly to the already existing wheels whose the spokes can be dismounted and bent locally on the level of the threaded part of the rod, for example using a bending apparatus envisaged for this purpose, before being again screwed in individually in their associated nut.

Of course, the invention is not limited to the embodiments described and represented by way of the examples, but it includes also all the technical equivalents and their combinations.

For example, it is possible to envisage a spoke curved before its screwing in the nut, and to envisage a nut with an additional means of bending of the same part or another part of the threaded rod, inside the housing of the nut.

The invention claimed is:

1. A device for mounting a spoke on a wheel rim or hub, including a spoke made up of a rod which extends along an axis and whose end is provided with external threads screwed into internal threads of a nut, mounted in an opening defined in the rim or the hub, at least a part of the threaded end of the spoke screwed in the nut is curved relative to the axis in order to increase braking torque by direct friction of the nut with respect to the rod, wherein the curved part presents a single curve.

2. The device according to claim 1, wherein the curved part of the threaded end of the spoke is curved inside the nut.

3. A device for mounting a spoke on a wheel rim or hub, including a spoke made up of a rod which extends along an axis and whose end is provided with external threads screwed into internal threads of a nut, mounted in an opening defined in the rim or the hub, at least a part of the threaded end of the spoke screwed in the nut is curved relative to the axis in order to increase braking torque by direct friction of the nut with respect to the rod, wherein the curved part of the threaded end of the spoke is curved outside an exit end of the nut.

4. A spoke adapted to be used in the device according to claim 3, wherein the rod has an unthreaded portion which extends straight along an axis and an end portion provided with external threads, at least a part of the threaded end portion of the spoke being curved relative to the axis.

5. The spoke according to claim 4, wherein the curving of the threaded end portion is such that the rod is coaxial with an elongated housing of the nut into which the threaded end portion is screwed, the elongated nut being mounted in a wheel rim.

6. A nut adapted to be used in the device for mounting a spoke on a wheel rim or hub, including a spoke made up of a rod which extends along an axis and whose end is provided with external threads screwed into internal threads of a nut, mounted in an opening defined in the rim or the hub, at least a part of the threaded end of the spoke screwed in the nut is curved relative to the axis in order to increase braking torque by direct friction of the nut with respect to the rod, wherein the nut includes a housing that defines an internal bore in which the internal threads are located, the housing defining a slope at one end of the nut which modifies the threaded end of the spoke being screwed into the internal threads to curve a part of the threaded end outside of the housing.

7. A device for mounting a spoke on a wheel rim or hub, including a spoke made up of a rod which extends along an axis and whose end is provided with external threads screwed into internal threads of a nut, mounted in an opening defined in the rim or the hub, at least a part of the threaded end of the spoke screwed in the nut is curved relative to the axis in order to increase braking torque by direct friction of the nut with respect to the rod, wherein the threaded end is screwed partially through the nut such that a portion of the threaded end exits the nut through an exit end of the nut and wherein the nut includes a structure adjacent the exit end of the nut which bends the portion of the threaded end that passes through the exit end of the nut to define a curve in the threaded portion.

8. A device for mounting a spoke on a wheel rim or hub, including a spoke made up of a rod which extends along an axis and whose end is provided with external threads screwed into internal threads of a nut, mounted in an opening defined in the rim or the hub, at least a part of the threaded end of the spoke screwed in the nut is curved relative to the axis in order to increase braking torque by direct friction of the nut with respect to the rod, wherein the nut includes an elongated housing which defines an elongated bore, the internal threads being defined in the internal bore, the elongated housing including at least one structure in the internal bore which bends the threaded end as the thread end screws into the internal threads to curve the threaded end relative to the axis.

9. A device comprising:
  a nut including an elongated housing configured to be received in an opening in a rim or hub and having an internal thread; and
  a spoke having an elongated rod with a threaded end, the threaded end including a curved portion which increases frictional interaction between the internal threads of the nut and the threaded end;
  wherein the nut includes an unthreaded structure which bends the threaded end as the threaded end is screwed into the internal threads to create the curved portion.

10. A device comprising:
  a nut including an elongated housing configured to be received in an opening in a rim or hub and having an internal thread; and
  a spoke having an elongated rod with a threaded end, the threaded end including a curved portion which increases frictional interaction between the internal threads of the nut and the threaded end;
  wherein the elongated housing of the nut includes a structure having a smooth, curved surface at an exit end, which structure bends a portion of the threaded end of the spoke as the portion of the threaded end exits the elongated housing.

\* \* \* \* \*